April 28, 1970 S. R. OVSHINSKY 3,508,968
THERMOELECTRIC DEVICE
Filed May 28, 1962
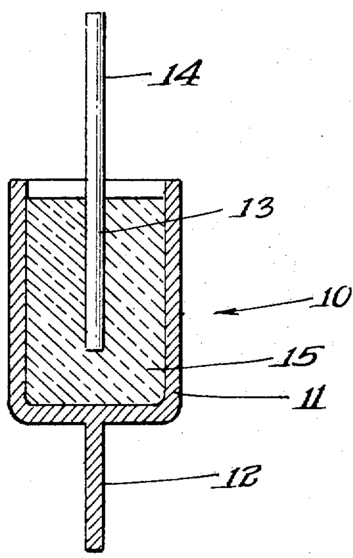
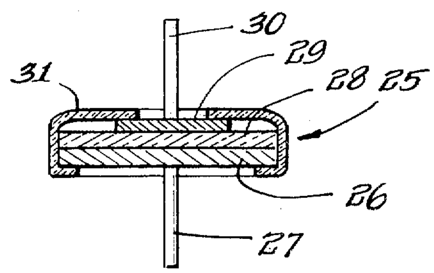
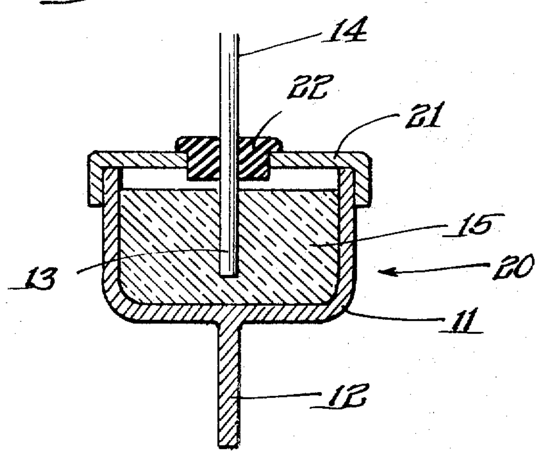
INVENTOR.
Stanford R. Ovshinsky
BY
Wallenstein, Spangenberg & Hattis
Attys.

3,508,968

THERMOELECTRIC DEVICE

Stanford R. Ovshinsky, Detroit, Mich., assignor, by mesne assignments, to Energy Conversion Devices, Inc., Troy, Mich., a corporation of Delaware Filed May 28, 1962, Ser. No. 198,093
Int. Cl. H01m
U.S. Cl. 136—83 10 Claims The principal object of this invention is to provide a thermocouple or thermoelectric device for producing or generating a substantial D.C. potential in accordance with differential temperature conditions resulting from heat asymmetrically applied thereto.

While thermocouple or thermoelectric devices have been made and proposed in the past, the D.C. potentials produced or generated thereby have been extremely low, in the range of microvolts and millivolts. However, in accordance with this invention, substantial D.C. potentials in the range of volts are readily produced and generated, and done so in an extremely simple, inexpensive and efficient manner. Thus, the thermocouple or thermoelectric device of this invention is admirably suited for the generation of subsantial voltages for general use, far beyond what has been accomplished to date, and also for temperature measurement and other purposes.

Briefly, the thermocouple or thermoelectric device of this invention includes a pair of spaced apart metallic electrodes and a lithium compound interposed between and in contact with those metallic electrodes. When there is a temperature differential between the metallic electrodes, caused, for example, by asymmetric heating of the device, the lithium compound produces a substantial D.C. potential between the metallic electrodes. Asymmetric heating to provide differential temperatures between the metallic electrodes may be occasioned by various means, as for example, by utilizing different sizes, shapes and masses for the metallic electrodes and by subjecting the metallic electrodes to different temperature conditions.

Also, in accordance with this invention, it has been discovered that various lithium compounds may exceptionally effectively be employed as the material between the metallic electrodes for producing or generating substantial D.C. potentials upon the occurrence of such temperature differentials. Among such lithium compounds are lithium carbonate, lithium hydroxide, lithium orthosilicate, lithium sulphate, lithium acetate, lithium metasilicate, lithium metaborate, lithium fluoride, lithium nitride, lithium nitrate, lithium oxide, lithium orthophosphate, and mixtures of any two or more thereof. Where the lithium compounds are to be exposed to atmospheric conditions, it is desirable to utilize lithium compounds which are essentially non-hygroscopic,and which are generally water-insoluble or only slightly water-soluble, preferably having a solubility below 15 parts per 100 parts of cold water, and better still, a solubility below 8 parts per 100 parts of cold water. Also, for the purposes of this invention, it has been found that the compositions obtained by essentially or completely burning metallic lithium in air or in oxygen are especially satisfactory. Such latter compositions appear to comprise mixtures of lithium carbonate, lithium hydroxide, and lithium oxide generally in approximately equal proportions. Also, especially useful is lithium hydroxide. In those instances in which hygroscopicity and appreciable water-solubility of the lithium compounds present difficulties due to the particular ambient atmospheric conditions of the environment in which the lithium compounds are to be used, as for example, in the case of lithium acetate, they may be encapsulated in a moisture free environment.

The lithium compounds utilized most advantageously in the practice of this invention are characterized by possessing with their metallic electrodes substantial D.C. potential producing capabilities when subjected to differential temperature conditions, such D.C. potential producing capabilities being present at temperatures in the solid and molten states of the lithium compounds up to the decomposition temperatures thereof. For example, thermoelectric or thermocouple devices, utilizing lithium compositions obtained by essentially completely burning metallic lithium, produce D.C. potentials of approximately 2.5 volts at temperature differentials of about 300° C. Where, under operating conditions, the lithium compounds are in the molten state, they may be maintained in place by suitable binders, such as lithium ceramic frit materials, or they may be contained in a suitable cup-shaped electrode provided with a suitable cover or closure.

Other objects and advantages of this invention will become apparent to those skilled in the art upon reference to the accompanying specification, claims and drawing in which:

FIG. 1 is a sectional view through one form of the thermoelectric or thermocouple device of this invention;

FIG. 2 is a vertical sectional view through another form thereof; and

FIG. 3 is a vertical sectional view through still another form of the thermoelectric or thermocouple device of this invention.

Referring first to FIG. 1, one form of the thermoelectric or thermocouple device of this invention is generally designated at 10. It includes a first metallic electrode 11 formed of steel or other suitable metal and it is generally cup-shaped in configuration, having a cylindrical side wall and a bottom wall. The cup-shaped electrode 11 is provided with an extension or lead 12 to which electrical connection may be made. A second metallic electrode 13 concentrically extends into the cup-shaped electrode 11 in spaced apart relation. This second metallic electrode may be formed of steel or any other suitable metal and the upward extension 14 thereof provides for electrical connection into a circuit.

Interposed between the metallic electrodes 11 and 13 is a lithium compound or composition 15 of the kind described above, and this lithium compound or composition contacts the electrodes 11 and 13. To produce a D.C. potential between the electrodes 11 and 13, one or the other of the electrodes is heated while the other electrode is maintained at a cooler temperature. Preferably, the smaller electrode 13 is heated while the larger electrode 11 is subjected to lower temperature conditions such as ambient temperature conditions. Because of this asymmetric heating, a temperature differential is produced in the lithium compound or composition between the metallic electrodes 13 and 11. As a result, a substantial D.C. potential is produced between these electrodes and the amount of this D.C. potential is dependent upon the amount of temperature differential. For example, where the lithium compound or composition 15 is obtained by essentially completely burning metallic lithium in an atmosphere containing oxygen, a D.C. potential of approximately 2.5 volts is produced at temperature differentials of about 300°.

The thermoelectric or thermocouple device of FIG. 1 may be utilized as a D.C. potential generator for supplying substantial D.C. voltages for commercial uses. The electrode 14 may be heated in any suitable manner, as by utilizing waste gases for projecting a flame thereon to provide inexpensive voltage generation. The thermoelectric or thermocouple device may also be utilized for temperature measurement purposes and, in this connection, the metallic electrode 11 may be maintained at a reference temperature, such as ambient temperature, and the other metallic electrode 14 may be subjected to the temperature to be measured. Thus, the thermoelectric or thermocouple device will produce a D.C. voltage in accordance with the temperature being measured to give a direct indication of that temperature. Since substantial D.C. potentials are produced by the thermoelectric or thermocouple device of this invention, accurate temperature measurements may be obtained with inexpensive measuring equipment, there being no need for expensive high gain amplifiers or the like in such temperature measuring equipment.

The D.C. potential producing capabilities of the thermoelectric or thermocouple device of this invention are present at temperatures involved in both the solid and molten states of the lithium compounds used up to the decomposition temperatures thereof so that the thermoelectric or thermocouple device of this invention is usable over a wide range of temperature conditions. Where, under operating conditions, the lithium compound or composition is in the molten state, it may be maintained in place in the cup-shaped electrode 11 by suitable binders, such as lithium ceramic frit materials or the like.

Another way of maintaining the molten lithium compound or composition in place in the cup-shaped electrode 11 is illustrated in FIG. 2. The thermoelectric or thermocouple device, generally designated at 20 in FIG. 2, corresponds in construction and manner of operation to the thermoelectric or thermocouple device designated at 10 in FIG. 1 and like reference characters for like parts have been utilized. In addition, the thermoelectric or thermocouple device 20 of FIG. 2 is provided with a cover or closure 21 for the open end of the cup-shaped electrode 11, it being suitably held in place thereon by welding or the like. The cover or closure 21 is centrally provided with an electrical insulating member 22, formed of ceramic or the like, which carries and seals the extension 14 of the electrode 13. The cover 21 and the insulator 22 operate to seal off the cup-shaped electrode 11 so that if the lithium compound or composition 15 is in a molten state, it cannot escape from the device. This cover with its insulator also operates to encapsulate the lithium compound or composition in an air free environment so as to protect the same from deterioration or the like where the lithium compound or composition would be adversely affected by ambient atmospheric conditions. If desired, an inert gas, such as helium or the like, may be sealed into the device in contact with the lithium compound for further protecting the lithium compound. Since the arrangement of FIG. 2 operates in the manner of the arrangement of FIG. 1, a further description of the operation of the arrangement of FIG. 2 is not necessary.

Still another form of the thermoelectric or thermocouple device of this invention is generally designated at 25 in FIG. 3. It includes a first metallic electrode 26 formed of steel or other suitable metal and which may be in the form of a disc or the like. Applied to one surface of this metallic electrode 26 is a suitable lithium compound or composition 28 of the kind recited above, the lithium compound or composition being in contact with the metal electrode 26. A second metallic electrode 29 formed of steel or any other suitable metal contacts the outer surface of the lithium compound or composition 28, the lithium compound or composition being arranged between the two metallic electrodes 26 and 29. The metallic electrodes 26 and 29 are provided with suitable extensions or leads 27 and 30 for connecting the thermoelectric or thermocouple device into a suitable electrical circuit, for example, for producing D.C. voltage potentials for general use or for temperature measurement purposes or the like. Here, when a temperature differential is provided between the metallic electrodes 29 and 26, as by heating the metallic electrode 29 while the metallic electrode 26 is maintained at a lower temperature, such as ambient temperature, a substantial D.C. potential is produced between the electrodes 29 and 26, the operation, in this respect, being as described above in connection with FIG. 1. Here, also, the thermoelectric or thermocouple device 25 may be encapsulated and an inert gas may be provided to protect the lithium compound if this be desired. In this respect, a cover 31 of glass or the like may extend from the electrode 26 to the electrode 29 and be bonded thereto and the interior of the cover may be filled with an inert gas, such as helium or the like.

While for purposes of illustration several forms of this invention have been disclosed, other forms thereof may become apparent to those skilled in the art upon reference to this disclosure and, therefore, this invention is to be limited only by the scope of the appended claims.

I claim as my invention:

1. A thermoelectric device for producing a D.C. electrical potential in accordance with differential temperature conditions consisting essentially of spaced apart first and second metallic electrodes of substantially the same metal, and a composition including as an essential active ingredient at least one lithium compound interposed between and in contact with said first and second metallic electrodes, means for producing respectively different temperatures at said first and second metallic electrodes, said at least one lithium compound being asymmetrically heated thereby and producing a substantial D.C. potential between said first and second metallic electrodes in accordance with the temperature differential therebetween, said device being so constructed that the said composition is not exposed to air or an active gas during production of said D.C. potential.

2. A thermoelectric device for producing a D.C. electrical potential in accordance with differential temperature conditions consisting essentially of spaced apart first and second metallic electrodes of substantially the same metal, and a composition including as an essential active ingredient at least one lithium compound interposed between and in contact with said first and second metallic electrodes, said at least one lithium compound adapted to be heated to a molten condition, means for producing respectively different temperatures at said first and second metallic electrodes, said at least one lithium compound being asymmetrically heated thereby and producing a substantial D.C. potential between said first and second metallic electrodes in accordance with the temperature differential therebetween, said device bieng so constructed that the said composition is not exposed to air or an active gas during production of said D.C. potential.

3. A thermoelectric device for producing a D.C. electrical potential in accordance with differential temperature conditions consisting essentially of spaced apart first and second metallic electrodes of substantially the same metal, and a composition including as an essential active ingredient at least one lithium compound interposed between and in contact with said first and second metallic electrodes, said at least one lithium compound adapted to be heated to a molten condition, said composition also including a binder for said at least one lithium compound for containing said at least one lithium compound when molten, means for producing respectively different temperatures at said first and second metallic electrodes, said at least one lithium compound being asymmetrically heated thereby and producing a substantial D.C. potential between said first and second metallic electrodes in accordance with the temperature differential therebetween, said device being so constructed that the said composition is not exposed to air or an active gas during production of said D.C. potential.

4. A thermoelectric device for producing a D.C. electrical potential in accordance with differential temperature conditions consisting essentially of spaced apart first and second metallic electrodes of substantially the same metal, and a composition including as an essential active ingredient at least one compound selected from the group consisting of lithium oxide, lithium hydroxide and lithium carbonate interposed between and in contact with said first and second metallic electrodes, means for producing respectively different temperatures at said first and second metallic electrodes, said at least one lithium compound being asymmetrically heated thereby and producing a substantial D.C. potential between said first and second metallic electrodes in accordance with the temperature differential therebetween, said device being so constructed that the said composition is not exposed to air or an active gas during production of said D.C. potential.

5. A thermoelectric device for producing a D.C. electrical potential in accordance with differential temperature conditions consisting essentially of spaced apart first and second metallic electrodes of substantially the same metal, and a composition including as an essential active ingredient at least one lithium compound consisting of the solid fusion product resulting from essentially fully burning lithium metal in air interposed between and in contact with said first and second metallic electrodes, means for producing respectively different temperatures at said first and second metallic electrodes, said at least one lithium compound being asymmetrically heated thereby and producing a substantial D.C. potential between said first and second metallic electrodes in accordance with the temperature differential therebetween.

6. A thermoelectric device for producing a D.C. electrical potential in accordance with differential temperature conditions consisting essentially of a first hollow cylindrical metallic electrodes, a second rod-like metallic electrode substantially concentrically extending into said one hollow cylindrical metallic electrode and spaced therefrom, said first and second metallic electrodes being of substantially the same metal, and a composition including as an essential active ingredient at least one lithium compound interposed between and in contact with said first and second metallic electrodes, means for producing respectively different temperatures at said first and second metallic electrodes, said at least one lithium compound being asymmetrically heated thereby and producing a substantial D.C. potental between said first and second metallic electrodes in accordance with the temperature differential therebetween.

7. A thermoelectric device for producing a D.C. electrical potential in accordance with differential temperature conditions consisting essentially of a first hollow cup-shaped metallic electrode, a second rod-like metallic electrode substantially concentrically extending into said one hollow cup-shaped metallic electrodes and spaced therefrom, said first and second metallic electrodes being of substantially the same metal, and a composition including as an essential active ingredient at least one lithium compound interposed between and in contact with said first and second metallic electrodes, means for producing respectively different temperatures at said first and second metallic electrodes, said at least one lithium compound being asymmetrically heated thereby and producing a substantial D.C. potential between said first and second metallic electrodes in accordance with the temperature differential therebetween.

8. A thermoelectric device for producing a D.C. electrical potential in accordance with differential temperature conditions consisting essentially of a first hollow cup-shaped metallic electrode, a second rod-like metallic electrode substantially concentrically extending into said one hollow cup-shaped metallic electrode and spaced therefrom, said first and second metallic electrodes being of substantially the same metal, and a composition including as an essential active ingredient at least one lithium compound interposed between and in contact with said first and second metallic electrodes, a cover for said one hollow cup-shaped metallic electrode, means for producing respectively different temperatures at said first and second metallic electrodes, said at least one lithium compound being asymmetrically heated thereby and producing a substantial D.C. potential between said first and second metallic electrodes in accordance with the temperature differential therebetween.

9. A thermoelectric device for producing a D.C. electrical potential in accordance with differential temperature conditions consisting essentially of spaced apart first and second disc-shaped metallic electrodes of substantially the same metal, and a composition including as an essential active ingredient at least one lithium compound interposed between and in contact with said first and second metallic electrodes, means for producing respectively different temperatures at said first and second metallic electrodes, said at least one lithium compound being asymmetrically heated thereby and producing a substantial D.C. potential between said first and second metallic electrodes in accordance with the temperature differential therebetween, said device being so constructed that the said composition is not exposed to air or an active gas during production of said D.C. potential.

10. A thermoelectric device for producing a D.C. electrical potential in accordance with differential temperature conditions consisting essentially of spaced apart first and second disc-shaped metallic electrodes of substantially the same metal, and a composition including as an essential active ingredient at least one lithium compound interposed between and in contact with said first and second metallic electrodes, a closure encapsulating at least said composition, means for producing respectively different temperatures at said first and second metallic electrodes, said at least one lithium compound being asymmetrically heated thereby and producing a substantial D.C. potential between said first and second metallic electrodes in accordance with the temperature differential therebetween, said device being so constructed that the said composition is not exposed to air or an active gas during production of said D.C. potential.

References Cited

UNITED STATES PATENTS

| | | | |
|---|---|---|---|
| 2,692,213 | 10/1954 | Dean | 117—130 |
| 2,827,401 | 3/1958 | Laughlin | 117—200 |
| 2,921,973 | 1/1960 | Heikes et al. | 136—238 X |
| 2,953,617 | 9/1960 | Heikes et al. | 136—238 X |
| 3,025,224 | 3/1962 | Kepes | 204—1 |
| 3,031,518 | 4/1962 | Werner | 136—86 |

OTHER REFERENCES

Marcus and Kelley: "Liquids As Thermoelectric Materials," in "Thermoelectric Materials and Devices," Cadoff and Miller (eds.), Reinhold Publishing Co., Inc., New York, 1960.

Sundheim: "Molten Salts As Thermoelectric Materials," in "Thermoelectric Materials and Devices," op. cit.

ALLEN B. CURTIS, Primary Examiner

U.S. Cl. X.R.

136—205